(12) United States Patent
Yuhas et al.

(10) Patent No.: US 10,710,887 B2
(45) Date of Patent: Jul. 14, 2020

(54) ZEOLITIC MATERIAL UZM-63

(71) Applicant: UOP LLC, Des Plaines, IL (US)

(72) Inventors: Benjamin Daniel Yuhas, Evanston, IL (US); Mimoza Sylejmani-Rekaliu, Bensenville, IL (US); Jaime G. Moscoso, Mt. Prospect, IL (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 16/375,098

(22) Filed: Apr. 4, 2019

(65) Prior Publication Data

US 2020/0156950 A1    May 21, 2020

Related U.S. Application Data

(60) Provisional application No. 62/770,590, filed on Nov. 21, 2018.

(51) Int. Cl.
| | |
|---|---|
| *C01B 39/48* | (2006.01) |
| *B01J 29/70* | (2006.01) |
| *B01J 20/18* | (2006.01) |
| *C10G 25/03* | (2006.01) |
| *C01B 39/46* | (2006.01) |
| *C01B 39/02* | (2006.01) |
| *B01J 29/06* | (2006.01) |

(52) U.S. Cl.
CPC ............... *C01B 39/46* (2013.01); *B01J 20/18* (2013.01); *B01J 29/061* (2013.01); *C01B 39/026* (2013.01); *C10G 25/03* (2013.01); *C01P 2002/72* (2013.01); *C01P 2004/03* (2013.01); *C01P 2004/64* (2013.01)

(58) Field of Classification Search
CPC .......... C01B 39/46; C01B 39/48; B01J 20/18; B01J 29/70; C01P 2002/72; C01P 2004/64; C10G 25/03
See application file for complete search history.

(56) References Cited

U.S. PATENT DOCUMENTS

| | | | | |
|---|---|---|---|---|
| 8,545,602 B2 * | 10/2013 | Chance | ................. | B01D 53/02 95/96 |
| 8,821,616 B2 * | 9/2014 | Zhou | .................... | B01D 53/228 210/650 |
| 9,168,483 B2 * | 10/2015 | Ravikovitch | .......... | B01D 53/04 |
| 9,868,642 B2 * | 1/2018 | Burton | .................... | C01B 39/48 |

FOREIGN PATENT DOCUMENTS

EP    0193282 A2 *    9/1986    ............. C07C 6/126

* cited by examiner

*Primary Examiner* — David M Brunsman

(57) ABSTRACT

The subject invention is a novel UZM-63 material which comprises globular aggregates of crystallites having a DDR framework type with a mesopore volume of at least 0.025 cc/g, the nanocrystals having an average diameter of less than 60 nm. The novel UZM-63 material is useful for hydrocarbon conversion processes as well as separation applications, particularly the separation of olefins from paraffins.

15 Claims, 4 Drawing Sheets

ZEOLITIC MATERIAL UZM-63

This application claims priority from Provisional Application No. 62/770590 filed Nov. 21, 2018, the contents of which are hereby incorporated by reference.

Field of the Invention

This invention relates to a nanocrystalline zeolitic material designated UZM-63. UZM-63 is represented by the empirical formula:

$$M_m^{n+}Q_q^{p+}AlSi_yO_z$$

where M represents an alkali or alkaline earth metal and Q is an organoammonium cation.

BACKGROUND OF THE INVENTION

Zeolites are crystalline aluminosilicates that are microporous and which are formed from corner-sharing $SiO_{4/2}$ and $AlO_{4/2}$ tetrahedra. Many zeolites, both naturally occurring and synthetically made, are used in various industrial processes, such as catalysis and/or separations. Synthetic zeolites are typically prepared via hydrothermal synthesis in which suitable sources of Si, Al are combined with structure directing agents (SDAs) such as alkali metal cations, alkaline earth metal cations, organoammonium cations, or amines. The SDAs reside in the zeolite pores and are primarily responsible for the particular structure that is ultimately formed. These species can balance the framework charge associated with the $AlO_{4/2}$ tetrahedra and can also serve as space fillers.

Zeolites are characterized by having pore openings of uniform dimensions, having a significant ion exchange capacity, and being capable of reversibly desorbing an adsorbed phase which is dispersed throughout the internal voids of the crystal without significantly displacing any atoms which make up the permanent zeolite crystal structure. Zeolites can be used as catalysts for hydrocarbon conversion reactions, which can take place on outside surfaces as well as on internal surfaces within the pore.

Zeolites can also be used for separations processes, in which a certain molecule can be readily adsorbed within the zeolite pore structure while another molecule may be rejected or excluded. The use of zeolites in separations takes advantage of the molecular sieve effect, in which maximum size of a molecule that can enter the zeolite pore structure is dictated by the size and shape of the pore openings or apertures. The size of the pore openings is typically defined by number of T-atoms (i.e., Si or Al atoms) that form a closed loop. For example, an 8-ring material contains closed loops of eight corner-sharing $SiO_{4/2}$ and/or $AlO_{4/2}$ tetrahedra. 8-ring materials, in particular, have been of considerable interest for small molecule separations, including carbon dioxide capture. When zeolites are used in separation applications, it is advantageous to fabricate them into a membrane. In order to fabricate the highest-quality membranes, it is preferred that the zeolite crystals are as small as possible.

SUMMARY OF THE INVENTION

The invention disclosed herein comprises a new zeolitic material called UZM-63. UZM-63 is a globular aggregate of nanocrystals with the DDR zeotype. One embodiment of the invention is a UZM-63 material that is a globular aggregate of nanocrystals of the DDR zeotype with a mesopore volume of at least 0.025 cc/g, the nanocrystals having an average diameter of less than 60 nm, and is represented in the as-synthesized and anhydrous form by the empirical formula:

$$M_m^{n+}Q_q^{p+}AlSi_yO_z$$

where M represents an alkali or alkaline earth metal, Q represents an organoammonium cation, "m" represents the mole ratio of M to Al and has a value from 0.02 to 0.95, "n" is the charge of metal or metals M, "q" is the mole ratio of organoammonium cation to Al and has a value 0.02 to 0.95, "p" is the charge of the organoammonium cation or cations, "y" is the mole ratio of Si to Al and has a ratio of about 8 to 25, and "z" is the mole ratio of O to Al and has a value determined by the equation:

$$z=(m\cdot n+q\cdot p+3+4\cdot y)/2$$

Another embodiment of the invention is a globular aggregate of nanocrystals with a mesopore volume of at least 0.025 cc/g, the nanocrystals having an average diameter of less than 60 nm, a, and is represented in the as-synthesized and anhydrous form by the empirical formula:

$$M_m^{n+}Q_q^{p+}AlSi_yO_z$$

where M represents an alkali or alkaline earth metal, Q represents an organoammonium cation, "m" represents the mole ratio of M to Al and has a value from 0.02 to 0.95, "n" is the charge of metal or metals M, "q" is the mole ratio of organoammonium cation to Al and has a value 0.02 to 0.95, "p" is the charge of the organoammonium cation or cations, "y" is the mole ratio of Si to Al and has a ratio of about 8 to 25, and "z" is the mole ratio of 0 to Al and has a value determined by the equation:

$$z=(m\cdot n+q\cdot p+3+4\cdot y)/2$$

and the invention is characterized in that it has the x-ray diffraction pattern having at least the d-spacings and intensities set forth in Table 1:

TABLE 1

| 2-Theta | d(Å) | Intensity |
|---------|------|-----------|
| 6.37-6.57 | 13.87-13.45 | w |
| 7.67-7.82 | 11.51-11.29 | m-s |
| 8.50-8.64 | 10.40-10.22 | vw |
| 11.31-11.48 | 7.82-7.70 | m |
| 12.79-12.96 | 6.92-6.82 | m |
| 14.31-14.49 | 6.19-6.10 | w-m |
| 15.38-15.57 | 5.76-5.68 | s |
| 17.11-17.28 | 5.18-5.12 | s-vs |
| 18.21-18.38 | 4.86-4.82 | m-s |
| 19.70-19.91 | 4.51-4.45 | m-s |
| 21.41-21.60 | 4.15-4.11 | m |
| 22.27-22.51 | 3.99-3.94 | w-m |
| 23.20-23.36 | 3.83-3.80 | m-s |
| 24.73-24.95 | 3.60-3.56 | vw-w |
| 25.79-25.98 | 3.46-3.42 | m-s |
| 26.17-26.36 | 3.41-3.37 | vs |
| 26.55-26.76 | 3.36-3.32 | s-vs |
| 26.87-27.10 | 3.32-3.28 | vw-s |
| 28.06-28.23 | 3.18-3.15 | vw-w |
| 28.94-29.13 | 3.09-3.06 | m |
| 29.28-29.84 | 3.05-2.99 | vw-m |
| 31.23-31.44 | 2.87-2.84 | vw-w |
| 36.89-37.23 | 2.44-2.41 | vw-w |
| 39.13-39.30 | 2.30-2.29 | w-m |

A further embodiment of the invention is a process for preparing the crystalline microporous UZM-63 zeolite described above. The process comprises forming a reaction mixture containing reactive sources of Q, Al, M and Si, and heating the reaction mixture at a temperature of about 60° C. to about 200° C. for a time sufficient to form the UZM-63, the reaction mixture having a composition expressed in terms of mole ratios of the oxides of:

$$aQ_2O:bM_{3-n}O:Al_2O_3:cSiO_2:dH_2O$$

where "a" has a value of about 1 to about 10, "b" has a value of about 0.05 to about 0.95, "c" has a value of about 20 to about 50, and "d" has a value of about 250 to about 1000.

Yet another embodiment of the invention is a hydrocarbon conversion process using the above-described UZM-63 as a catalyst. The process comprises contacting at least one hydrocarbon with the UZM-63 at conversion conditions to generate at least one converted hydrocarbon.

Still another embodiment of the invention is an adsorption process using the crystalline UZM-63 material. The process may involve the adsorption and desorption of olefins and/or paraffins over UZM-63. Separation of molecular species can be based either on the molecular size (kinetic diameter) or on the degree of polarity of the molecular species. Removing contaminants may be by ion exchange with the UZM-63.

DETAILED DESCRIPTION OF THE INVENTION

Figure 1:
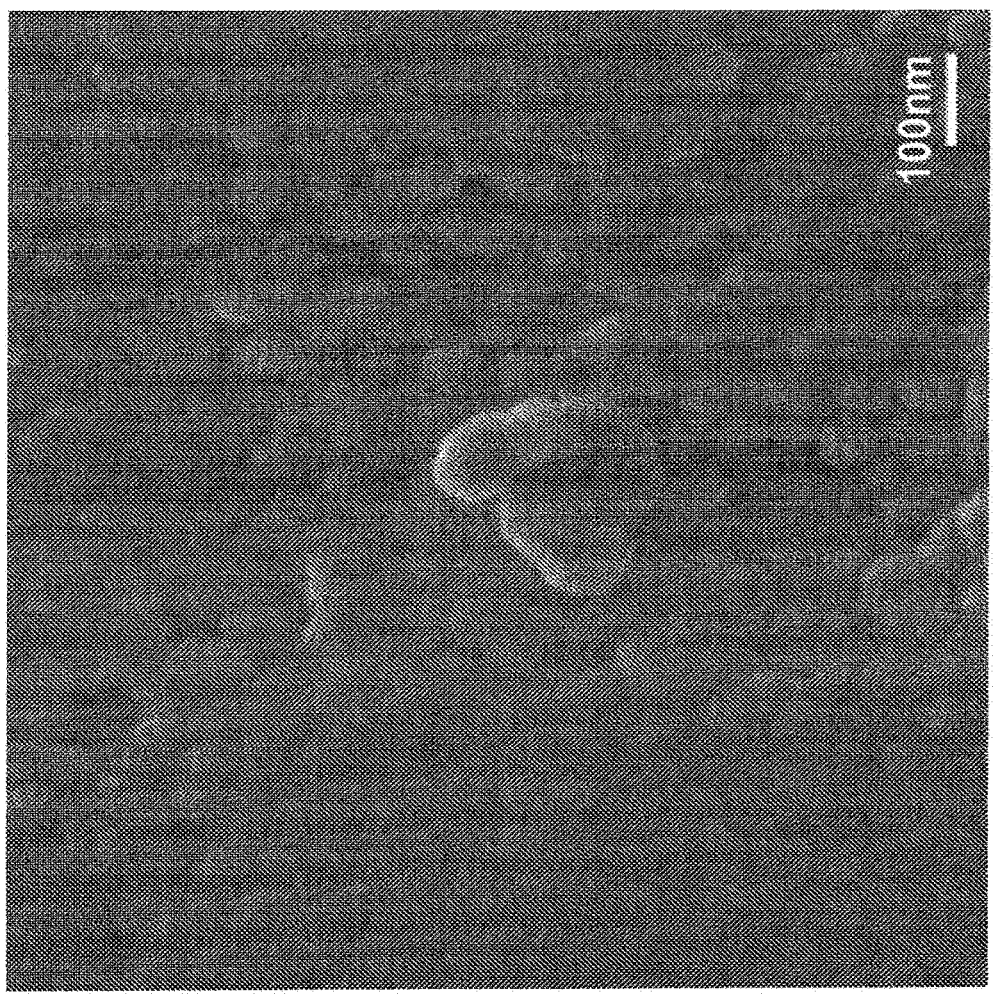
FIG. 1 is a scanning electron microscope (SEM) image of an exemplary UZM-63 material according to an embodiment described herein.

The UZM-63 of the present invention is a novel aluminosilicate zeolite with unique adsorption properties and catalytic activity. The UZM-63 zeolite has a DDR framework type as described in the *Atlas of Zeolite Framework Types*, 6$^{th}$ *Revised Edition*, C. H. Baerlocher, L. B. McCusker, D. H. Olson, eds. (2007), pp. 108-109. The DDR structure comprises corner-sharing $SiO_{4/2}$ and/or $AlO_{4/2}$ tetrahedra arranged so that the crystal lattice contains 8-ring cage openings in two dimensions. The zeolite is usually characterized by a $SiO_2/Al_2O_3$ ratio from about 20-50, and preferably from about 30-45. The UZM-63 of the present invention is based on the discovery that specific crystal characteristics allow improved accessibility to the UZM-63 micropores, which results in better mass transfer and improved separation ability.

The UZM-63 material of the present invention features one or more of the following characteristics:
1. Globular aggregates with a mesopore volume of at least 0.025 cc/g, and preferably at least 0.04 cc/g;
2. Average crystallite diameter of 60 nm or less, and preferably 40 nm or less;
3. $Si/Al_2$ ratio between 20 and 50, and preferably between 30 and 45.

The UZM-63 of the present invention has a composition in the as-synthesized and anhydrous form represented by the empirical formula:

$$M_m^{n+}Q_q^{P+}AlSi_yO_z$$

where M represents an alkali or alkaline earth metal; examples of which include Li, Na, K, Rb, Cs, Mg, Ca, Sr, Ba, and mixtures thereof. Q is at least one organoammonium cation, represented as $(NR_4^+)$. There may be multiple distinct R groups on the same quaternary nitrogen. A particular R group may have the formula $C_nH_{2n+1}$, where n is a whole number ranging from 1 to 4, inclusive. Non-limiting examples of component Q include tetramethylammonium, ethyltrimethylammonium, diethyldimethylammonium, methyltriethylammonium, tetraethylammonium, tetrapropylammonium, propyltrimethylammonium, isopropyltrimethylammonium, butyltrimethylammonium, dipropyldimethylammonium, dimethyldiisopropylammonium, and methylethyldipropylammonium. In a preferred embodiment, Q is dimethyldiisopropylammonium. "m" represents the mole ratio of M to Al and has a value from 0.02 to 0.95, "n" is the charge of metal or metals M, "q" is the mole ratio of organoammonium cation to Al and has a value 0.02 to 0.95, "p" is the charge of the organoammonium cation or cations, "y" is the mole ratio of Si to Al and has a ratio of about 8 to 25, and "z" is the mole ratio of O to Al and has a value determined by the equation:

$$z=(m \cdot n+q \cdot p+3+4 \cdot y)/2$$

The UZM-63 aggregate material of the invention is prepared by hydrothermal crystallization of a mixture containing reactive sources or M, Q, aluminum and silicon. The sources of aluminum include but are not limited to aluminum alkoxides, precipitated aluminas, aluminum metal, aluminum hydroxide, aluminum salts and alumina sols. Specific examples of aluminum alkoxides include, but are not limited to aluminum ortho sec-butoxide and aluminum ortho isopropoxide. Sources of silica include but are not limited to tetraethylorthosilicate, colloidal silica, and precipitated silica. Sources of the M metals include the halide salts, nitrate salts, acetate salts, sulfate salts, and the hydroxides of the respective alkali and alkaline earth metals. The source of the organoammonium cation Q may be the hydroxide, bromide, iodide, chloride, or fluoride salt. Specific examples of Q may be dimethyldiisopropylammonium hydroxide or dimethyldiisopropylammonium bromide.

The reaction mixture is reacted at a temperature of about 125° C. to about 200° C. and preferably from about 150° C. to about 180° C. for a period of about 1 day to about 21 days and preferably for a time of about 2 days to about 10 days in a sealed reaction vessel at autogenous pressure. The reaction vessel may be heated with stirring, heated while tumbling, or heated quiescently. After crystallization is complete, the solid product is isolated from the heterogeneous mixture by means such as filtration or centrifugation, and then washed with deionized water and dried in air at ambient temperature up to about 100° C. UZM-63 seeds can optionally be added to the reaction mixture in order to accelerate the formation of the desired microporous composition.

The UZM-63 material of the present invention features one or more of the following characteristics:
1. Globular aggregates with a mesopore volume of at least 0.025 cc/g, and preferably at least 0.04 cc/g;
2. Average crystallite diameter of 60 nm or less, and preferably 40 nm or less;
3. $Si/Al_2$ ratio between 20 and 50, and preferably between 30 and 45

Figure 2:
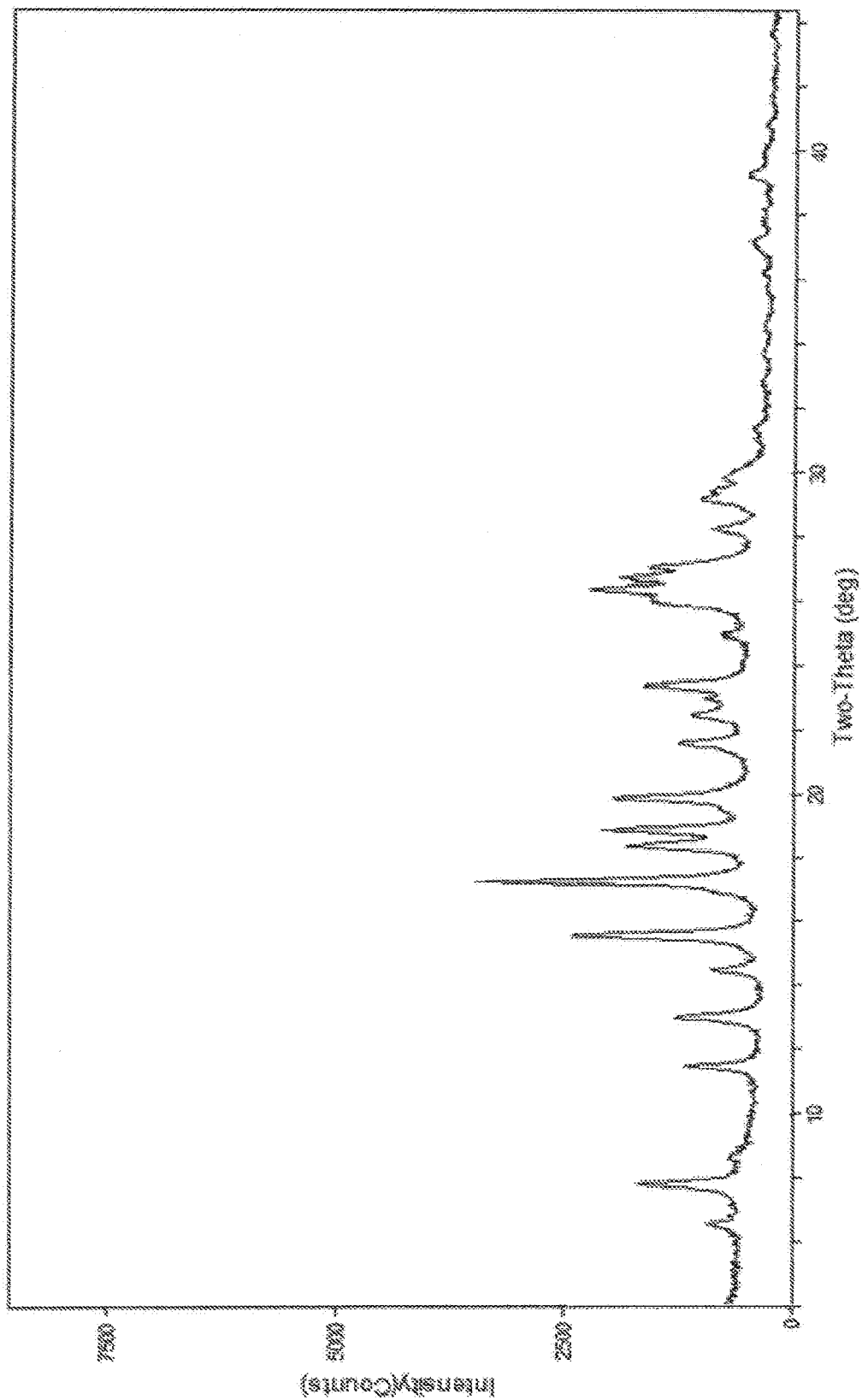
FIG. 2 is an x-ray diffraction pattern of an exemplary UZM-63 material in the as-synthesized form.

In many applications, it is advantageous to have small zeolite nanocrystals and/or globular aggregates. Such materials often have improved mass transfer during catalysis, as their small size allows for maximum accessibility. A specific example may be found in the case of UZM-14 (U.S. 7687423), in which the globular character of that material gave rise to increased aromatic transalkylation activity. Applicants have found through the use of low-water, low-alkali synthesis methods that globular aggregates of UZM-63 can be produced. The globular aggregates of UZM-63 possess the DDR zeotype. The UZM-63 nanocrystals have an average crystal diameter of less than 60 nm, and preferably less than 40 nm. The average crystal diameter is determined both from electron microscope images and from Scherrer analysis on X-ray diffraction (XRD) patterns of UZM-63. An example of such a pattern is shown in FIG. 2. Scherrer analysis, which is well known in the art, is performed by measuring the full width at half maximum (FWHM) of the peaks in the UZM-63 XRD pattern. The crystalline diameter L is then calculated as:

$$L = \frac{0.9\lambda}{\beta\cos\theta}$$

where $\lambda$ is the wavelength of Cu $K_\alpha$ radiation, $\theta$ is one-half of the diffraction angle, and $\beta$ is the FWHM of the diffraction peak corrected for instrumental broadening, as calculated by:

$$\beta^{1/2} = B^{1/2} - b^{1/2}$$

where "B" is the measured FWHM of the diffraction peak and "b" is the measured FWHM for an instrumental standard that exhibits only instrumental broadening. The average crystallite size as determined from Scherrer analysis was found to be in good agreement with the average crystallite size obtained from electron microscopy images. A representative SEM image of UZM-63 is shown in FIG. 1.

The globular nature of UZM-63 is a product of its synthesis conditions and the composition of the reaction mixture described above. UZM-63 is produced when the composition in terms of mole ratios falls within the following ranges as shown in Table 2:

TABLE 2

| Attribute | Broad | Preferred |
|---|---|---|
| Si/Al$_2$ | 20-50 | 30-45 |
| [OH$^-$]/Si | 0.10-0.40 | 0.15-0.30 |
| Q/Si | 0.05-0.35 | 0.10-0.20 |
| M/Si | 0.005-0.045 | 0.010-0.040 |
| H$_2$O/Si | 8-20 | 12-18 |
| Q/(Q + M) | 0.75-1.00 | 0.80-1.00 |

Figure 3:
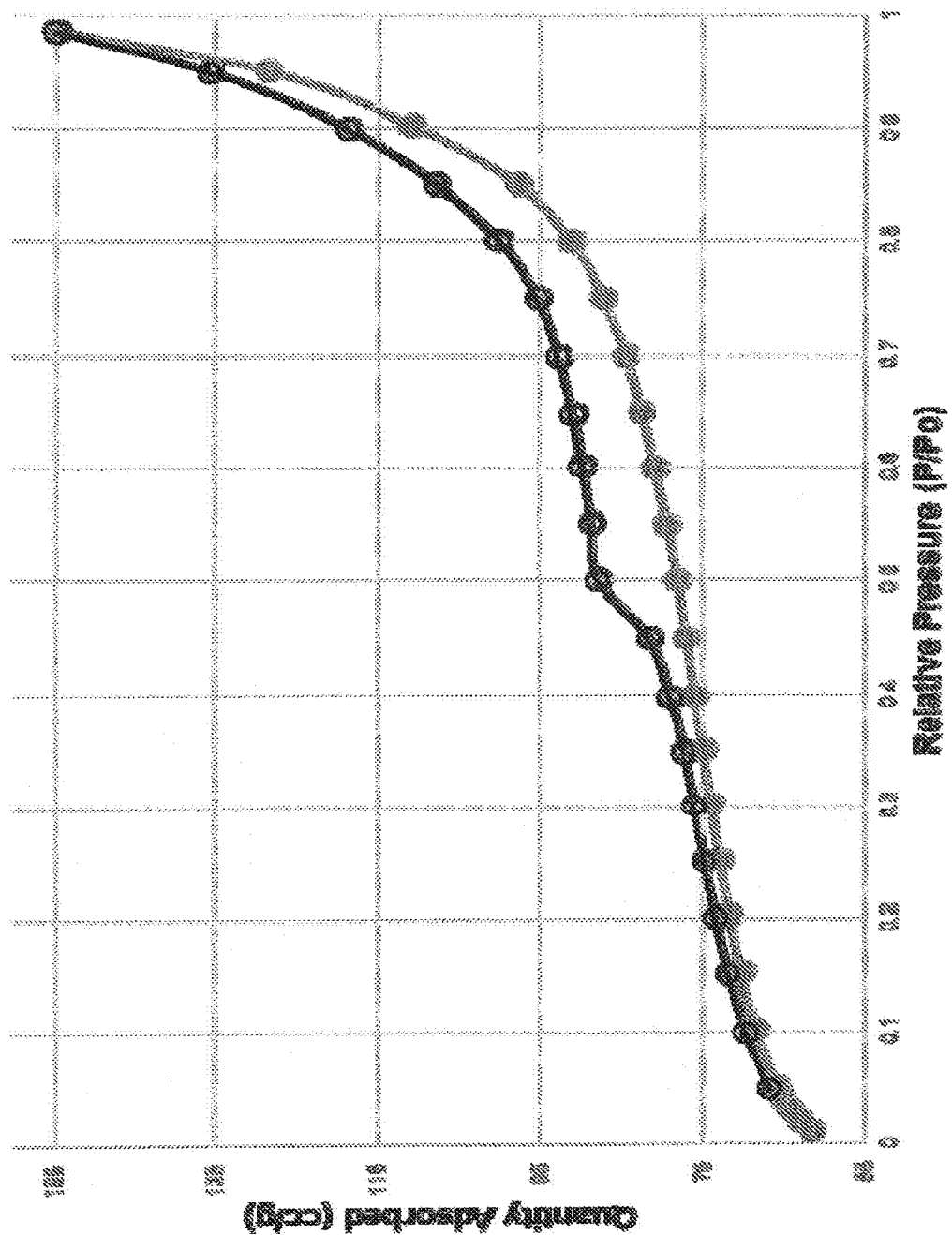
FIG. 3 is a graph showing a nitrogen adsorption isotherm at 77K on the proton form of UZM-63.

The mesopore volume for UZM-63 was determined from nitrogen adsorption isotherms, such as that shown in FIG. 3. The isotherm was measured at 77K in a Micromeritics ASAP 2020 instrument. The UZM-63 was calcined to remove the occluded organic species, and then converted to the proton form using standard ion-exchange techniques. The total pore volume of UZM-63 was determined as follows. First, the nitrogen uptake at a relative pressure (P/P$_0$) of 0.95 was determined. Then, DFT methods were used to calculate the total pore volume for all pores less than 400 Å in size. The micropore volume was calculated using the t-plot method. A thickness range of 3.4-5.0 Å was considered, using a Broekhoff-de Boer thickness curve. The mesopore volume was then obtained by subtracting the micropore volume from the total pore volume.

As mentioned previously, the DDR structure type comprises corner-sharing SiO$_{4/2}$ and/or AlO$_{4/2}$ tetrahedra arranged so that the crystal lattice contains 8-ring cage openings in two dimensions. The dimensionality and aperture size of the DDR zeotype has made it a promising material for separation applications. One example separation application is the separation of olefins from paraffins, such as the separation of propene from propane. (see, for example, W. Zhu et al. Chem. Commun. p. 2453-2454 (1999); J. Gascon et al. Micropor. Mesopor. Mater., 115, 585-593 (2008)). Another example separation application is the separation of carbon dioxide from nitrogen and/or methane (see, for example, S. Himeno et al. Micropor Mesopor. Mater., 98, 62-69 (2007); S. E. Jee and D. S. Sholl, J. Am. Chem. Soc. 131, 7896-7904 (2009)). In most of these separation applications, it is preferred that the active adsorbing component be incorporated into a membrane, and the fabrication of zeolite membranes is well known in the art (see, for example, M. A. Carreon et al., J. Am. Chem. Soc. 130, 5412-5413 (2008); K. Weh, et al., Micropor. Mesopor. Mater. 54, 27-36 (2002); T. Tomita, K. Nakayama, H. Sakai Micropor. Mesopor. Mater., 68, 71-75 (2004); also US6488741, US6953493, US8263512). In zeolite membrane fabrication, the adsorbing component is grown from zeolite seed crystals, and it is preferred that the seed crystals be as small as possible. In the case of the DDR zeotype, the seed crystals are primarily made by milling large crystals down to a smaller size, such as 200 nm (see US8821616). Smaller crystals have been reported only in pure-silica forms (e.g., US9901882).

In contrast to the prior art, UZM-63 is made as nanocrystals directly from the synthesis gel, without the need for crystal size reduction by milling or grinding. The synthesis parameters are chosen as described in Table 2, which enables the formation of the globular aggregates of UZM-63. Unlike prior reports of small crystal all-silica zeolites with the DDR zeotype, such as those reported in US8821616 or US9901882, the UZM-63 nanocrystals contain both SiO$_{4/2}$ and AlO$_{4/2}$ tetrahedra in the zeolite framework. The globular nature of UZM-63 combined with the acidity imparted by the presence of Al atoms in the zeolite framework makes UZM-63 an effective material for both separation applications and catalysis. The UZM-63 compositions of this invention can be used as a catalyst or catalyst support in various hydrocarbon conversion processes. Hydrocarbon conversion processes are well known in the art and include cracking, hydrocracking, alkylation of both aromatics and isoparaffin, isomerization, polymerization, reforming, hydrogenation, dehydrogenation, transalkylation, dealkylation, hydration, dehydration, hydrotreating, hydrodenitrogenation, hydrodesulfurization, methanol to olefins, methanation and syngas shift process.

The UZM-63 materials may also be used as a catalyst for the conversion of methanol to olefins. The methanol can be in the liquid or vapor phase with the vapor phase being preferred. Contacting the methanol with the UZM-63 catalyst can be done in a continuous mode or a batch mode with a continuous mode being preferred. The amount of time that the methanol is in contact with the UZM-63 catalyst must be sufficient to convert the methanol to the desired light olefin products. When the process is carried out in a batch process, the contact time varies from about 0.001 hrs to about 1 hr and preferably from about 0.01 hr to about 1.0 hr. The longer contact times are used at lower temperatures while shorter times are used at higher temperatures. When the process is carried out in a continuous mode, the Weight Hourly Space Velocity (WHSV) based on methanol can vary from about 1 hr-1 to about 1000 hr-1 and preferably from about 1 hr-1 to about 100 hr-1.

Generally, the process must be carried out at elevated temperatures in order to form light olefins at a fast enough rate. Thus, the process should be carried out at a temperature of about 300° C. to about 600° C., preferably from about 400° C. to about 550° C. and most preferably from about 435° C. to about 525° C. The process may be carried out over a wide range of pressure including autogenous pressure. Thus, the pressure can vary from about 0 kPa (0 psig) to about 1724 kPa (250 psig) and preferably from about 34 kPa (5 psig) to about 345 kPa (50 psig).

Optionally, the methanol feedstock may be diluted with an inert diluent in order to more efficiently convert the methanol to olefins. Examples of the diluents which may be used are helium, argon, nitrogen, carbon monoxide, carbon dioxide, hydrogen, steam, paraffinic hydrocarbons, e. g., methane, aromatic hydrocarbons, e. g., benzene, toluene and mixtures thereof. The amount of diluent used can vary considerably and is usually from about 5 to about 90 mole percent of the feedstock and preferably from about 25 to about 75 mole percent.

The actual configuration of the reaction zone may be any catalyst reaction apparatus known in the art. Thus, a single reaction zone or a number of zones arranged in series or parallel may be used. In such reaction zones the methanol feedstock is flowed through a bed containing the UZM-63 catalyst. When multiple reaction zones are used, one or more UZM-63 catalysts may be used in series to produce the desired product mixture. Instead of a fixed bed, a dynamic bed system, (e. g., fluidized bed or moving bed), may be used. Such a dynamic system would facilitate any regeneration of the UZM-63 catalyst that may be required. If regeneration is required, the UZM-63 catalyst can be continuously introduced as a moving bed to a regeneration zone where it can be regenerated by means such as oxidation in an oxygen containing atmosphere to remove carbonaceous materials.

EXAMPLES

In order to more fully illustrate the invention, the following examples are set forth. It is to be understood that the examples are only by way of illustration and are not intended as an undue limitation on the broad scope of the invention as set forth in the appended claims. The x-ray patterns presented in the following examples were obtained using standard x-ray powder diffraction techniques. The radiation source was a high-intensity, x-ray tube operated at 45 kV and 35 mA. The diffraction pattern from the copper K-alpha radiation was obtained by appropriate computer based techniques. Flat compressed powder samples were continuously scanned at 2° to 56° (2θ). Interplanar spacings (d) in Angstrom units were obtained from the position of the diffraction peaks expressed as θ where θ is the Bragg angle as observed from digitized data. Intensities were determined from the integrated area of diffraction peaks after subtracting background, "$I_0$" being the intensity of the strongest line or peak, and "I" being the intensity of each of the other peaks.

As will be understood by those skilled in the art, the determination of the parameter 2θ is subject to both human and mechanical error, which in combination can impose an uncertainty of about ±0.4° on each reported value of 2θ. This uncertainty is, of course, also manifested in the reported values of the d-spacings, which are calculated from the 2θ values. This imprecision is general throughout the art and is not sufficient to preclude the differentiation of the present crystalline materials from each other and from the compositions of the prior art. In some of the x-ray patterns reported, the relative intensities of the d-spacings are indicated by the notations vs, s, m, w, and vw which represent very strong, strong, medium, weak, and very weak respectively. In terms of $100 \times I/I_0$, the above designations are defined as:

vw=0–5; w=5–15; m=15–40: s=40–75 and vs=75–100

Example 1

8.04 grams of deionized water was added to a 100 mL beaker. To the water 0.47 grams of liquid sodium aluminate was added, followed by 13.82 grams of dimethyldiisopropylammonium hydroxide and 4.33 grams of fumed silica. The slurry was mixed at 300 RPM with an overhead mixer for 15 min. The mixture was transferred into a 45cc autoclave and heated quiescently to 175° C. in 2 hours and held at 175° C. for five days. After cooling to room temperature, the material was isolated via centrifugation and dried at 100° C. overnight. XRD analysis of the material gave the following peaks:

| 2-Theta | d(Å) | Intensity |
|---|---|---|
| 6.371 | 13.862 | w |
| 7.6967 | 11.4771 | s |
| 8.5773 | 10.3006 | vw |
| 11.3452 | 7.793 | m |
| 12.8379 | 6.8901 | m |
| 14.369 | 6.1592 | w |
| 15.4256 | 5.7396 | s |
| 17.1554 | 5.1645 | s |
| 18.2889 | 4.8469 | m |
| 18.7699 | 4.7238 | m |
| 19.7624 | 4.4887 | m |
| 21.4564 | 4.138 | m |
| 22.2769 | 3.9874 | w |
| 23.2841 | 3.8172 | m |
| 24.7358 | 3.5964 | vw |
| 25.86 | 3.4425 | m |
| 26.2179 | 3.3963 | vs |
| 26.6127 | 3.3468 | s |
| 26.9703 | 3.3032 | vw |
| 28.0892 | 3.1742 | w |
| 29.0255 | 3.0739 | m |
| 29.3994 | 3.0356 | m |
| 31.2704 | 2.8581 | vw |
| 37.1194 | 2.4201 | vw |
| 39.2222 | 2.295 | w |

This material was identified as UZM-63 by XRD.

Example 2

4.93 grams of deionized water was added to a 100 mL beaker. To the water, 0.68 grams of liquid sodium aluminate was added, followed by 16.83 grams of dimethyldiisopropylammonium hydroxide (DMDIPAOH; SAChem, 10% w/w), followed by 4.21 grams of fumed silica and 0.16 grams of UZM-63 seed. The slurry was mixed at 300 RPM with an overhead mixer for 15 min. The mixture was transferred into a 45 cc autoclave and heated to 175° C. in 2 hours and held at 175° C. for eight days while tumbling at 40 RPM. After cooling to room temperature, the material was isolated via centrifugation and dried at 100° C. overnight. ICP analysis showed a composition of 44.7% Si, 2.49% Al, and 0.83% Na (weight percent). XRD analysis of the material gave the following peaks:

| 2-Theta | d(Å) | Intensity |
|---|---|---|
| 6.5656 | 13.4516 | w |
| 7.8183 | 11.2988 | m |

-continued

| 2-Theta | d(Å) | Intensity |
|---|---|---|
| 8.6377 | 10.2288 | vw |
| 11.4805 | 7.7015 | m |
| 12.9577 | 6.8266 | m |
| 14.4873 | 6.1091 | w |
| 15.5629 | 5.6892 | s |
| 17.2578 | 5.1341 | s |
| 18.3727 | 4.825 | m |
| 18.8891 | 4.6943 | m |
| 19.8846 | 4.4614 | m |
| 21.5775 | 4.1151 | m |
| 22.509 | 3.9468 | w |
| 23.3507 | 3.8064 | m |
| 24.9429 | 3.567 | vw |
| 25.9781 | 3.4271 | s |
| 26.3557 | 3.3789 | vs |
| 26.7343 | 3.3319 | s |
| 27.0526 | 3.2934 | m |
| 28.2279 | 3.1589 | w |
| 29.1245 | 3.0636 | m |
| 29.839 | 2.9919 | m |
| 31.4306 | 2.8439 | vw |
| 37.2051 | 2.4147 | w |
| 39.2985 | 2.2908 | w |

This material was identified as UZM-63 by XRD.

Example 3

3.43 grams of deionized water was added to a 100 mL beaker. To the water 0.68 grams of liquid sodium aluminate and 0.07 grams of potassium hydroxide was added, followed by 12.24 grams of dimethyldiisopropylammonium hydroxide, 4.15 grams of fumed silica, and 0.16 grams of UZM-63 seed. The slurry was mixed at 300 RPM with overhead mixer for 15 min. The mixture was transferred into 45 cc autoclaves and heated to 175° C. in 2 hours and held at 175° C. for seven days while tumbling at 40 RPM. After cooling to room temperature, the material was isolated via centrifugation and dried at 100° C. overnight. XRD analysis of the material gave the following peaks:

| 2-Theta | d(Å) | Intensity |
|---|---|---|
| 6.5412 | 13.5016 | w |
| 7.7988 | 11.327 | s |
| 8.6392 | 10.227 | vw |
| 11.4597 | 7.7154 | m |
| 12.9567 | 6.8272 | m |
| 14.4699 | 6.1165 | m |
| 15.5453 | 5.6957 | s |
| 17.275 | 5.1291 | vs |
| 18.352 | 4.8304 | s |
| 18.848 | 4.7044 | s |
| 19.903 | 4.4573 | s |
| 21.5963 | 4.1115 | m |
| 22.4727 | 3.9531 | m |
| 23.3687 | 3.8035 | s |
| 24.9033 | 3.5725 | w |
| 25.9585 | 3.4297 | s |
| 26.335 | 3.3815 | vs |
| 26.754 | 3.3295 | vs |
| 27.093 | 3.2886 | s |
| 28.1872 | 3.1633 | w |
| 29.1234 | 3.0638 | m |
| 29.8397 | 2.9918 | m |
| 31.3313 | 2.8527 | w |
| 37.2272 | 2.4133 | w |
| 39.2987 | 2.2908 | m |

Example 4

The product from Example 2 was calcined in air at 600° C. for 6 hours. The furnace was ramped to the target temperature at a rate of 2° C./min. The calcined powder was ion exchanged once in 1M of $NH_4NO_3$ solution at 80° C. for 2 hours to obtain the ammonium form of UZM-63. This material was then converted to the proton form by heating the ammonium form in air at 500° C. for 2 hours. The surface area and mesopore volume of this material, determined from nitrogen adsorption at 77 K, was found to be 275 $m^2$/g and 0.082 cc/g, respectively.

Example 5

Figure 4:
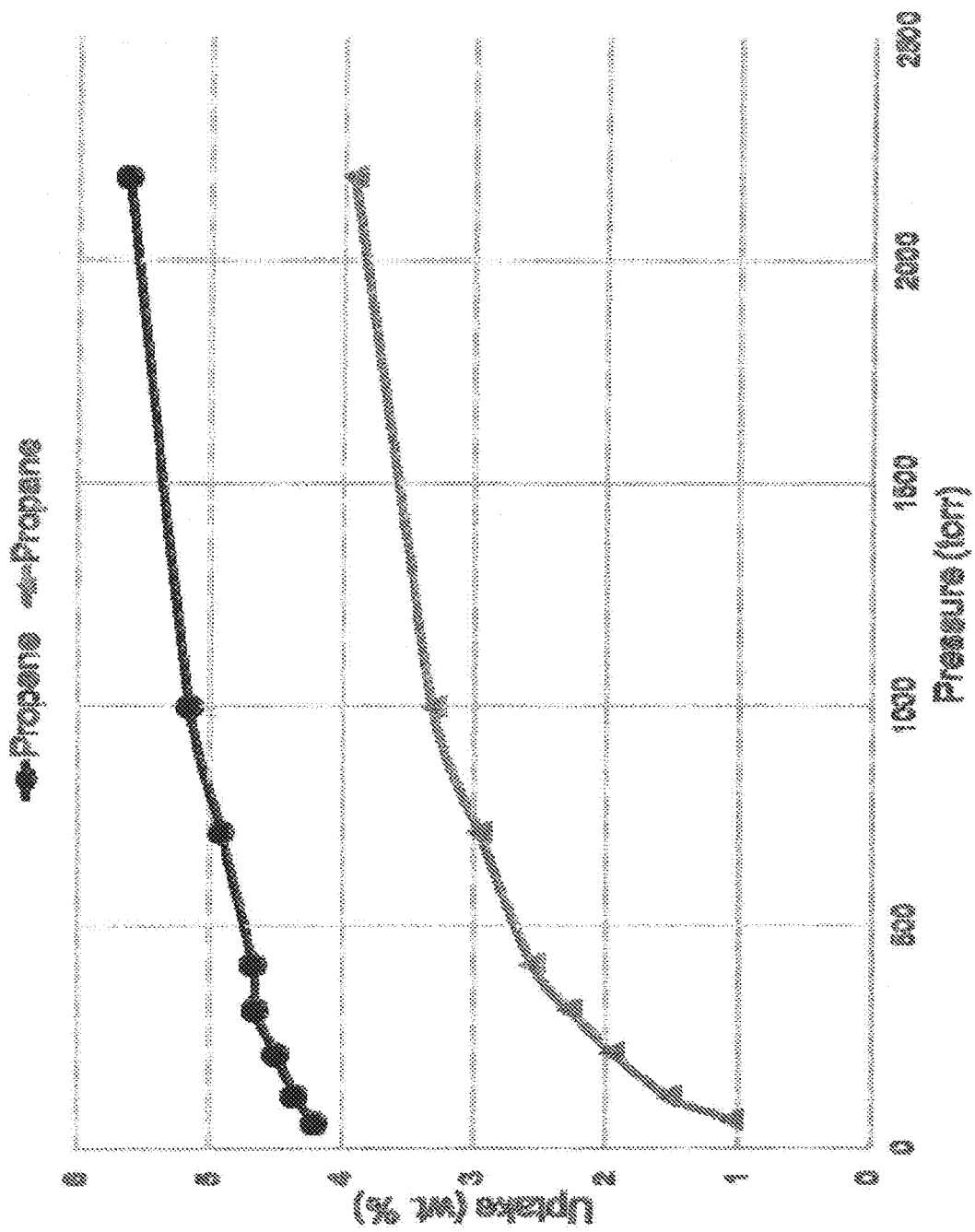
FIG. 4 is a graph showing propene and propane uptake on the proton form of UZM-63.

The product from Example 4 was examined for olefin/paraffin separation in a Cahn microbalance. Adsorption isotherms of propene and propane were obtained in a pressure range of 50-2200 torr at temperatures ranging 30-80° C. An example isotherm at 30° C. is presented at FIG. 4. At this temperature and at 60 torr, a molar selectivity of 4.2 was observed for propene over propane.

Example 6

The product of Example 4 was sized by a 40/60 standard stainless steel mesh. 325 mg of the sized solid was placed in a fixed bed reactor for methanol to olefin (MTO) catalysis testing. The bed was heated to about 435° C., and a methanol feed stream was introduced to the reactor at a pressure of approximately 5 psig. The following product selectivities were observed at breakthrough:

| Species | Selectivity (%) |
|---|---|
| Ethylene | 36.52 |
| Ethane | 0.81 |
| Propylene | 40.12 |
| Propane | 1.88 |
| Total C4 | 10.93 |
| Total C5 | 5.48 |

The invention claimed is:

1. A UZM-63 material comprising globular aggregates of crystallites having a DDR framework type comprising 8-ring channels, a mesopore volume of at least 0.025 cc/g, an average crystallite diameter of 60 nm or less, and a $Si/Al_2$ ratio from about 20 to about 50.

2. The UZM-63 material of claim 1 wherein the mesopore volume is at least 0.04 cc/g.

3. The UZM-63 material of claim 1 wherein the average crystallite diameter is about 50 nm or less.

4. The UZM-63 material of claim 1 wherein the average crystallite diameter is about 40 nm or less.

5. A method of making a UZM-63 microporous crystalline material comprising preparing a reaction mixture containing reactive sources described in terms of molar ratios of the oxides by a formula:

where "Q" represent an organoammonium cation, "M" represents an alkali or alkaline earth metal, "a" has a value of about 1 to about 10, "b" has a value of about 0.05 to about 0.95, "c" has a value of about 20 to about 50, and "d" has a value of about 250 to about 1000, wherein reactive sources of Q, M, Al and Si are combined into a reaction mixture, heating the reaction mixture at a temperature of about 125°

C. to about 200° C. for a period of about 1 day to about 21 days; and isolating a solid product from the reaction mixture wherein the UZM-63 globular aggregate material is characterized by the x-ray following diffraction pattern, having at least the d-spacings and relative intensities set forth in Table 1:

| 2-Theta | d(Å) | Intensity |
|---|---|---|
| 6.37-6.57 | 13.87-13.45 | w |
| 7.67-7.82 | 11.51-11.29 | m-s |
| 8.50-8.64 | 10.40-10.22 | vw |
| 11.31-11.48 | 7.82-7.70 | m |
| 12.79-12.96 | 6.92-6.82 | m |
| 14.31-14.49 | 6.19-6.10 | w-m |
| 15.38-15.57 | 5.76-5.68 | s |
| 17.11-17.28 | 5.18-5.12 | s-vs |
| 18.21-18.38 | 4.86-4.82 | m-s |
| 19.70-19.91 | 4.51-4.45 | m-s |
| 21.41-21.60 | 4.15-4.11 | m |
| 22.27-22.51 | 3.99-3.94 | w-m |
| 23.20-23.36 | 3.83-3.80 | m-s |
| 24.73-24.95 | 3.60-3.56 | vw-w |
| 25.79-25.98 | 3.46-3.42 | m-s |
| 26.17-26.36 | 3.41-3.37 | vs |
| 26.55-26.76 | 3.36-3.32 | s-vs |
| 26.87-27.10 | 3.32-3.28 | vw-s |
| 28.06-28.23 | 3.18-3.15 | vw-w |
| 28.94-29.13 | 3.09-3.06 | m |
| 29.28-29.84 | 3.05-2.99 | vw-m |
| 31.23-31.44 | 2.87-2.84 | vw-w |
| 36.89-37.23 | 2.44-2.41 | vw-w |
| 39.13-39.30 | 2.30-2.29 | w-m. |

6. The method of claim 5 wherein sources of aluminum are selected from the group consisting of aluminum alkoxides, precipitated aluminas, aluminum metal, aluminum hydroxide, aluminum salts and alumina sols.

7. The method of claim 5 wherein sources of silica are selected from the group consisting of tetraethylorthosilicate, colloidal silica, and precipitated silica.

8. The method of claim 5 wherein sources of the M metals are selected from the group consisting of halide salts, nitrate salts, acetate salts, sulfate salts, and the hydroxides of the respective alkali and alkaline earth metals.

9. The method of claim 5 wherein Q is an organoammonium cation represented as $NR_4^+$.

10. The method of claim 9 wherein the R groups are, independently, aliphatic carbon chains of the formula $C_nH_{2n-1}$, where n is a whole number ranging from 1 to 4, inclusive.

11. The method of claim 9 where Q is dimethyldiisopropylammonium.

12. A process of separating mixtures of molecular species, removing contaminants or catalyzing hydrocarbon conversion processes comprising contacting a feed stream with a UZM-63 globular aggregate material that has a DDR framework type comprising 8-ring channels, a mesopore volume of at least 0.025 cc/g, an average crystallite diameter of 60 nm or less, and a $Si/Al_2$ ratio from about 20 to about 50.

13. The process of claim 12 wherein said hydrocarbon conversion processes are selected from the group consisting of cracking, hydrocracking, alkylation of aromatics or isoparaffins, isomerization, polymerization, reforming, hydrogenation, dehydrogenation, transalkylation, dealkylation, hydration, dehydration, hydrotreating, hydrodenitrogenation, hydrodesulfurization, methanol to olefins, methanation and a synthesis gas shift process.

14. The process of claim 12 wherein said separation of molecular species is based on the molecular size (kinetic diameter) or on the degree of polarity of the molecular species.

15. The process of claim 14 wherein olefins are separated from paraffins.

* * * * *